(12) United States Patent
Higginson et al.

(10) Patent No.: US 6,425,106 B1
(45) Date of Patent: Jul. 23, 2002

(54) EXTENDED ECC SYSTEM

(75) Inventors: Peter Leslie Higginson, Cuffley; Anthony Neil Berent, Hook, both of (GB)

(73) Assignee: Enterasys Networks, Inc., Portsmouth, NH (US)

(*) Notice: Subject to any disclaimer, the term of this patent is extended or adjusted under 35 U.S.C. 154(b) by 0 days.

(21) Appl. No.: 09/398,488

(22) Filed: Sep. 17, 1999

Related U.S. Application Data

(63) Continuation of application No. 08/442,253, filed on May 15, 1995, now Pat. No. 5,954,835, which is a continuation of application No. 08/072,287, filed on Jun. 4, 1993, now abandoned.

(30) Foreign Application Priority Data

Jun. 23, 1992 (GB) .......................................... PD92-0489

(51) Int. Cl.[7] ............................................... G06F 11/10
(52) U.S. Cl. ....................................... 714/759; 714/807
(58) Field of Search ................................. 714/759, 807, 714/746, 758; 370/514; 375/364; 345/368

(56) References Cited

U.S. PATENT DOCUMENTS

| | | | |
|---|---|---|---|
| 3,872,430 A | 3/1975 | Bounre et al. | 371/37.1 |
| 4,151,510 A | 4/1979 | Howell et al. | 371/37.7 |
| 4,541,093 A | 9/1985 | Furuya et al. | 371/37.4 |
| 4,577,313 A | 3/1986 | Sy | 370/88 |
| 4,937,828 A | 6/1990 | Shih et al. | 371/37.1 |
| 5,043,989 A | 8/1991 | Dalmas et al. | 371/37.1 |
| 5,062,104 A | 10/1991 | Labarsky et al. | 370/60 |
| 5,068,854 A | 11/1991 | Chandran et al. | 371/37.1 |
| 5,121,396 A | 6/1992 | Irvin et al. | 371/37.1 |
| 5,251,215 A | 10/1993 | Dravian et al. | 371/37.7 |
| 5,610,951 A | * 3/1997 | Higginson et al. | 375/364 |

FOREIGN PATENT DOCUMENTS

| | | |
|---|---|---|
| EP | 003480 | 8/1979 |
| EP | 0441041 | 8/1991 |
| EP | 0445730 | 9/1991 |

* cited by examiner

Primary Examiner—Paul P. Gordon
(74) Attorney, Agent, or Firm—Wolf, Greenfield & Sacks, P.C.

(57) ABSTRACT

A packet is originated in a unit 10 as a data field DATA 11 plus a CRC (cyclic redundancy check) check field CRC 12 by a CRC circuit 13. This packet has a header HDR (with a routing information field RIF) added to it in a unit 20, converting it into a message for transmission through a message network. A check correction field CCF is computed by unit 23 in unit 20, by looking up precomputed check subfields stored with the routing subfields (the routing information field being constructed by selecting from the stored subfields), such that the CRC field is a valid CRC check field for the complete message. At the destination, unit 30 can be the final user unit, checking the entire message and extracting the data field DATA therefrom; the DATA field does not need to be checked, as the CRC field acts as a check both for the data field DATA alone and the entire message. (Alternatively, the message can be checked by a final switching unit 30 using a standard CRC check circuit 32 (and similarly at intermediate units 30', 30") and the original packet can be checked by another standard CRC check circuit 42 in the final user unit 40. ).

5 Claims, 2 Drawing Sheets

EXTENDED ECC SYSTEM

This application is a continuation application of prior application No. 08/442,253 filed May 15, 1995 which issued as U.S. Pat. No. 5,954,835 on Sep. 21, 1999; which is a continuation of application No. 08/072,287 filed Jun. 4, 1993, now abandoned, which claimed priority to UK Application 9213272.9 filed Jun. 23, 1992.

FIELD OF THE INVENTION

The present invention, relates to the provision of check quantities for digital data, particularly for data transmission.

DISCUSSION OF RELATED ART

The use of ECC (error detecting and/or correcting codes) for digital data is well established. ECC is used, where the data is to be stored or transmitted by some means which is liable to occasional error. The data has a check portion or field appended to it to form a packet when it is entered into the storage or transmission means. When the packet is retrieved, the check field is used to detect whether errors have occurred and, in some situations, to correct them. A new check field may for example be calculated from the data field of the packet and compared with the check field in the packet. It is convenient to distinguish the data and check portions of the packet, but the check field checks the entire packet, ie itself as well as the data field.

A variety of ECC techniques have been proposed. Obviously, ease of implementation is important; for practical utilization, there must be some easily implemented algorithm for calculating the check field from the data field. If the system is to be used for error correction, then there must also be an effective technique for calculating the required corrections to the data field from the (erroneous) packet. However, if only error detection is required, then there is no need for an efficient means of determining the precise nature of the error. Pure error detection, with no correction, is for examples commonplace in many message transmission networks, because if an error is detected, the message can be retransmitted.

A widely used group of ECCs is cyclic ECCs. These are generally known as CRCs (cyclic redundancy check codes), and can readily be used for checking fields of variable length. A CRC code generates a check field which is termed the CRC field and is normally appended to the end of the data being checked. The present invention finds its main application with CRCs, and will be described in terms of CRCs rather than ECCs generally.

For present purposes, a CRC can be regarded as involving the division of the data field (regarded as a binary value) by a fixed binary value termed a polynomial, using arithmetic over the Galois fields GF2 (ie modulo 2 and without carries between different positions). The remainder is the CRC or check field. The classical technique for calculating a CRC involves using a shift register with a feedback circuit including XOR gates at the positions corresponding to the 1s (powers of x) in the polynomial. (Details of this can be found in Error Correcting Codes, 2nd edition, Peterson & Weldon, MIT 1972.)

Many digital systems, consist of a variety of physically distributed units, and require data to be passed between the various units. In some such systems, the connections may be relatively simple; eg there may be separate connections between each pair of units, or there may be a single master unit to which all other units are connected. In most large multi-unit systems, however, the connections between the units, together with the interfaces between the units and the connections, form a distinct subsystem.

Such a subsystem is termed a digital data transmission network. Such a network may consist of a switching network having a number of switching nodes interconnected with each other, or an area network such as a LAN (Local Area Network), or a combination of switching networks and area networks. (An area network has a common communication medium with, normally, a large number of units connected to it.)

The present invention is mainly, though not exclusively, concerned with such digital data transmission networks.

With such networks, it is the responsibility of the network to achieve the proper carriage of data between the end units connected to the network. This typically involves determining suitable routing for the data (eg through a suitable sequence of switching nodes). The routing information required for this is a function of the network, independent of the end units. The switching network therefore normally has to add a header including routing information to the data as received from the source (originating) end unit. This header is either stripped off just before the message is delivered to the destination (receiving) end unit, or is ignored by that unit.

This complicates the application of ECC.

The original data, as generated by the originating end unit, will often be generated with its own CRC, and for various reasons, it is often highly desirable for the data to retain this CRC throughout its journey to the receiving end unit. The transmission network must therefore treat this combination of data plus its CRC as a unit (which we will term a packet). The transmission network adds a header to this packet (we will term this combination of header plus packet a message). (It will be realized that terms such as packet and message are used here with specific senses which may not be identical with their usual meanings in the context of message transmission networks.)

Just as for the data generally, it is often desirable for the header to be checkable; ie for ECC to be applied. But the precise manner in which ECC (which means, in practice, CRC) is applied to the message involves various considerations and is not entirely straightforward.

One option is not to use a CRC for the header, in the expectation that an error in the header will result in the message failing to reach an end unit or, if it reached the wrong end unit, that end unit rejecting it; the sending end until will then not receive an acknowledgement of its receipt, and will in due course resend it. This may not be acceptable.

A second option is to generate a header CRC for the header, so that the message consists of the header with its CRC, plus the packet (the data with its CRC).

A third option is for the packet to be encapsulated, with the header being added to the front of the packet and a combined CRC for the header plus packet being calculated and added at the end of the message.

A factor which has to be taken into consideration in selecting an option is whether the transmission network protocol is predetermined. If it is not, then any option may be chosen. But if it is, then the choice of option may be forced. The standard protocols require that the message should have a CRC at the end which checks the entire message, which forces the adoption of the third option.

SUMMARY OF THE INVENTION

The main object of the present invention is to provide an improved technique for providing error detection for messages in message networks.

The crux of the present invention lies in including, in the header of a message, a check correction field (CCF) which is chosen such that the CRC of the packet is also a valid CRC for the entire message. This means that the message will automatically conform to the usual message network protocol. (It will be realized that the nature of the contents of the header is not relevant, although we have described the header as containing routing information for use in a message network.)

The main advantage of this is that the CRC of the message forms a check for both the data of the original packet and the header, so a single CRC check verifies the accuracy of both the message as a whole and the data alone. This is in contrast to the known techniques discussed above. In the first of those, the header is not checked, and in the second, it is obvious that the header and the data are checked independently. In the third, the packet encapsulation technique, it is possible for an error to occur in the packet as the CRC for the message (packet plus header) is being calculated; so a CRC check on the entire message using the CRC of the message, therefore verified only the message header, and a second CRC check is therefore required on the packet extracted from the message to verify the integrity of the data.

The construction of the CCF will normally be performed in the interfacing between the originating end unit and the message network. Although the general functionality of this interfacing may be determined by the predetermined characteristics of the message network, it will normally be controllable by the user to the extent that it can be arranged to generate the CCF.

In some complex message networks, it may be necessary for the header to be changed as the message passes through the network. Again, the network nodes where this takes place will normally be controllable by the user to the extent that they can be arranged to generate a CCF for the new header which maintains the CRC of the packet as valid for the whole message.

An essential feature of the present system is that the CCF can be determined without reference to the packet, ie from the header alone. It will be realized that this places a certain constraint on the nature of the ECC used. Broadly, the ECC must be linearly superposable (or be divisible into components which are linearly superposable) rather than being one which performs an encryption (of the kind intended to discourage or prevent unauthorized reading of the information).

Broadly, the process of generating the check field must be linear, in the sense that the sum of the check fields for two different fields (the original data and the header) is the check field for the concatenation of the fields. This constraint is in fact satisfied by most popular ECCs, including in particular CRCs, and also by other codes with the appropriate structure of linear components, such as BCH codes.

The simple or basic CRC has been developed into a form known as "modified CRC". This involves the use of a second polynomial which is dependent on the length of the message. This form prevents two concatenated messages with CRCs from forming a single message with a correct CRC. For example, the X.25 standard uses a polynomial $$X^{15}+X^{14}+\ldots+X^1+1)(X^{k+16}+1),$$

where the first terms in the product is a conventional CRC polynomial (with selected powers of x) and the second term is dependent on the length of k of the data field. Although this is not linear, it can be separated into components which behave linearly for present purposes.

This modified CRC has now displaced the standard CRC virtually completely in message networks, and from here on we will work exclusively in terms of this modified CRC.

The calculation of the CCF depends on its location in the header. If it is at the end of the header, the calculation consists of calculating the CRC for the header (eg by using a conventional feedback shift register) and then making a fixed adjustment to it, which can be treated as an inversion (ie XORing with an all 1s subfield).

It may be desirable to locate the CCF inside the header, ie not at the end. If this is the case, the calculation of the CRC for the header requires a minor adjustment. The portion of the header following the CCF has to be divided not by the CRC polynomial but by its reciprocal polynomial, obtained by reading it in the reverse direction (eg the reciprocal polynomial of $x^3+x^2+x^0$ is $x^3+x^1+x^0$). The result of this calculation has to be combined with the result for the portion of the header preceding the CCF by exclusive-ORing (without inversion). If the CCF is the last field of the header, then the result of the backwards calculation with the reciprocal polynomial is a constant which depends only on the polynomial, and can easily be combined into the CCF.

The routing header will normally consist of a number of subfields, eg destination, source, and message type. In many situations, most or all of these subfields will be known in advance. This means that their contributions to the CCF (check subfields) can be calculated in advance. The CCF can the generally be determined by a relatively simple calculation based on those pre-calculated check subfields (XORing the check subfields together, and incorporating the fixed adjustment described above). Of course, if a new subfield is required, then its check subfield has to be calculated.

If the subfields occur largely in fixed or mainly fixed combinations, the combined contribution of these subfields to the CCF can also, of course, be pre-calculated as a single value. Similarly, it may be possible to include the result of the backwards calculation with the reciprocal polynomial (if required) in this value. Calculating the CCF will then involve combining the contribution of the fixed combination of subfields with the check subfields of any further header subfields.

The precalculation of the value of a check subfield may be done by calculating it as a normal CRC check field for the header using a feedback shift register (taking all the other header subfields as empty). This check subfield value must then be stored with the associated header subfield.

If the message is to pass through two different levels of switching network, a header with a CCF field may be added at one stage and a second header with its own CCF field added at a later stage, with the original header (with its CCF field) being treated as part of the packet or data. Such a switching network may also require the position of some components of the message to be changed. Such components must also be treated as parts of the new header.

BRIEF DESCRIPTION OF THE DRAWING

An embodiment of the invention will now be described, by way of example, with reference to the drawings, in which.

DETAILED DESCRIPTION

Figure 1:
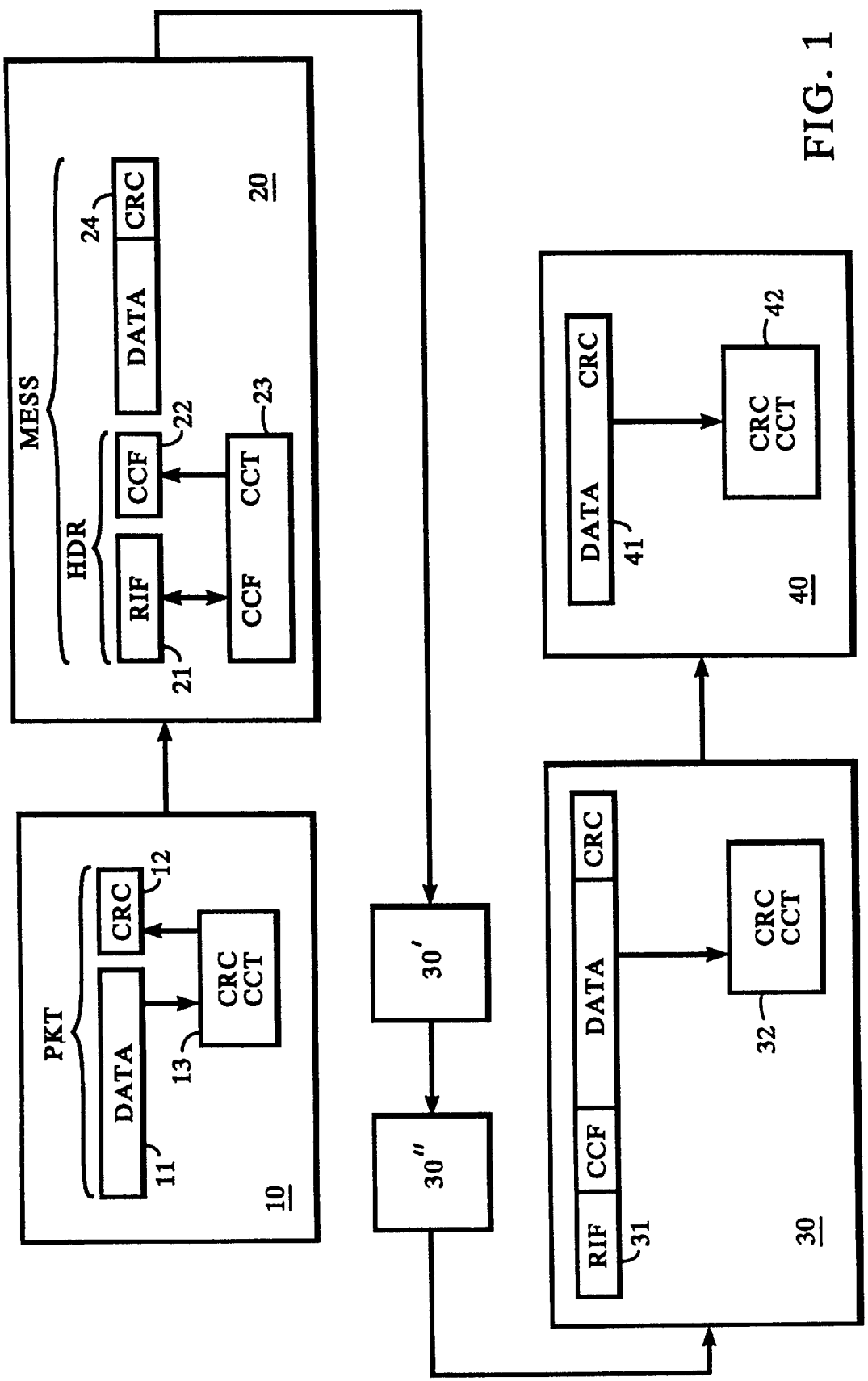
FIG. 1 is a block diagram of part of a digital data transmission network.

Referring now to FIG. 1, a message transmission network is shown as including a source end unit 10 and three routing devices 20, 30, and 40. These illustrate part of the path of a particular data field through the network, which will of course include many such units.

The source end unit 10 includes a register 11 in which the data field, which is to be sent to the destination unit 40, is generated. This unit 10 also includes a CRC circuit 13 which is fed with data field and calculates a CRC therefrom, and a CRC register 12 into which the CRC so calculated is fed. The CRC circuit 13 may be a look-up table unit or a feedback shift register unit. The CRC field is concatenated with the data field to form a packet PKT, which is transmitted by the unit 10.

The packet is passed to a routing unit 20 which derives, from information provided by unit 10, the source and destination addresses (in the routing network) for transmitting the packet to a destination unit 30. In this routing unit, these addresses are combined (possibly after conversion to other forms) to form a route information field RIF which is stored in a register 21. This unit 20 also includes a CCF circuit 23 which is fed with RIF field and calculates a CCF therefrom, and a CCF register 22 into which the CCF so calculated is fed. (The RIF field may be generated in register 21 and passed to the CCF circuit 23 for the calculation of the CCF, or it may be generated in the CCF circuit 23 as described below and passed to the RIF register 21.)

The RIF field in register 21 is concatenated with the CCF field in register 22 to produce a header HDR. The packet itself from unit 10 is fed into a packet register 24, and this is concatenated with the header to produce a message MESS, which is transmitted by the unit 20.

Figure 2:
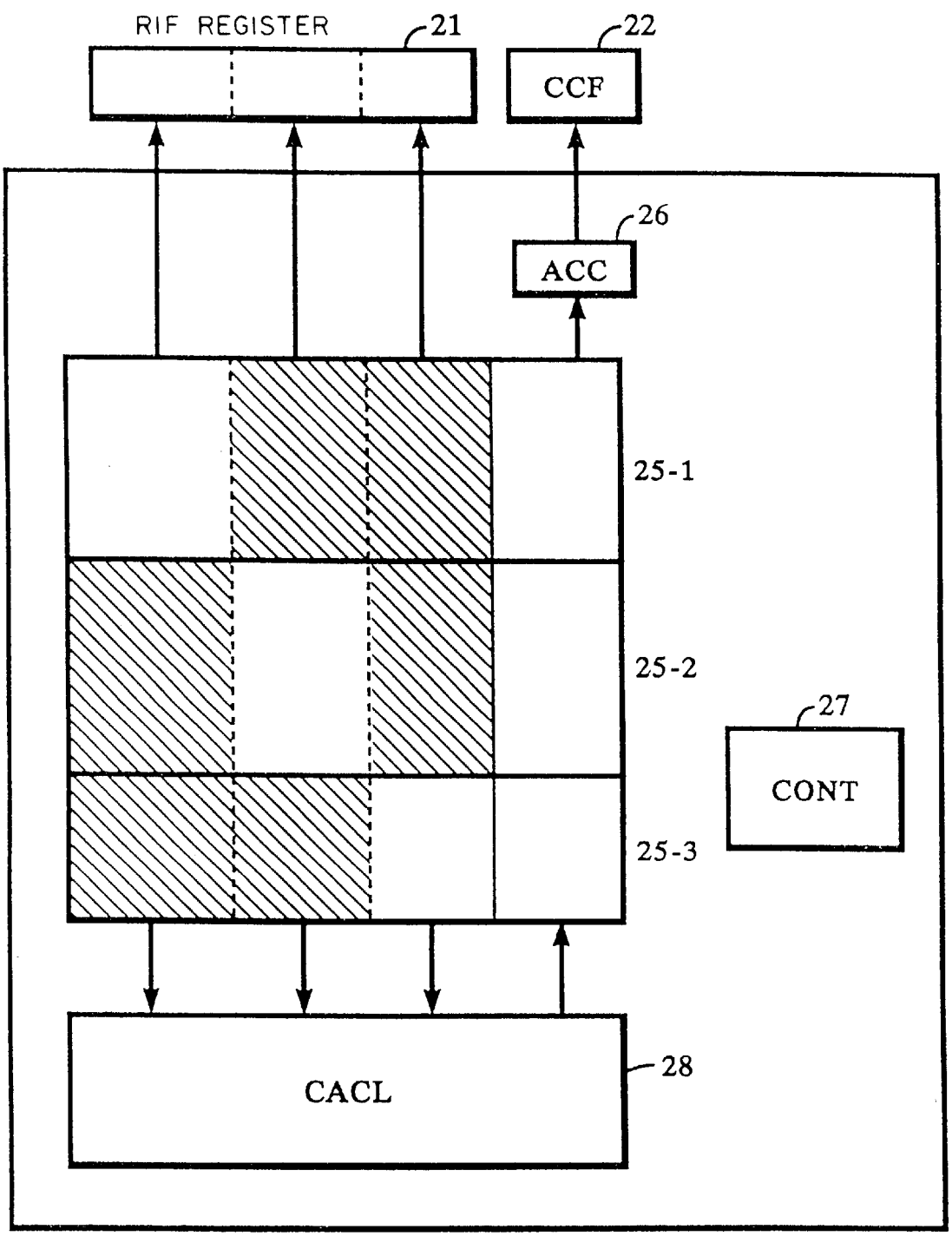
FIG. 2 is a more detailed block diagram of the CCF unit 23 in unit 20 of the network.

FIG. 2 shows the CCF circuit 23 in more detail. This circuit comprises a set of look-up tables 25–1 to 25–', one for each subfield of the RIF, and an XOR accumulator 26. Each of the look-up tables contains a set of values for its subfield, together with the corresponding check subfield values. (It is convenient to store all three tables in a single memory, as shown, with all three subfields in each location, with each subfield value being accompanied by two unused and empty subfields, shown shaded). A control unit 27 selects, from each look-up table in turn, the desired subfield value, which is passed to the RIF register 21. The selection of the subfield values may be determined, for example, in accordance with the desired final end unit to which the data is to be sent in combination with stored routing tables maintained by the unit 20 as part of the message network.

At the same time as the RIF subfield value is looked up, its associated check subfield value is also looked up and passed to the accumulator 26, which adds the check subfield values according to polynomial arithmetic (bitwise XORing). A final fixed adjustment has to be made (as discussed above) to adjust the result for the fact that the check system is a modified CRC system. This adjustment is in fact achieved by adjusting the check subfield values in any convenient one of the three look-up tables.

The final contents of the accumulator 26 are passed to the CCF register 22. The CCF field generated by the CCF circuit 23 is thus concatenated with the CCF field to produce the header HDR as described above.

The CCF circuit 23 also includes a check subfield calculation unit 28 for calculating the check subfields for newly generated RIF subfields. (Obviously the calculation of new check subfields may impose some delay on the operation of the unit 20.)

Returning to FIG. 1, the message is sent by routing unit 20 to a second routing unit 30, which checks the message. The message has its RIF, CCF, DATA, and CRC fields entered into a register 31. The routing unit also includes a CRC circuit 32 which is fed with contents of register 31 and calculates a CRC from the entire contents of the register 31. The fact that the CRC is included in the calculation means that the result should be a predetermined value. The CRC circuit 32 emits an error signal if some other value results.

The CRC circuit 32 can be identical to the CRC circuit 13 of unit 10, apart from the fact that the CRC circuit 32 has to calculate its CRC from a longer quantity than the circuit 13.

We will assume that unit 30 is the final unit in the switching network. The header is stripped off the message by unit 30, which therefore passes only the packet part of the message on to the final destination unit, unit 40. This unit checks the packet, the whole of which (DATA and CRC fields) is entered into a register 41. The routing unit also includes a CRC circuit 42 which is fed with the contents of register 41 and calculates a CRC therefrom. This should yield a predetermined value; the CRC circuit 42 emits an error signal if some other value results.

Obviously the message may be transmitted through any number of units similar to unit 30, as shown at 30' and 30".

Instead of unit 30 passing the packet to the final unit 40, unit 30 may itself be the final unit. In this case, the unit 30 will be as shown, but will extract the DATA field directly from register 31, discarding the RIF and CCF fields. The single check performed by the CRC circuit 32 will in this case verify the integrity of both that the DATA field and the header.

A further possibility is that the header may need to be changed at some stage along the route of the message. For this, a unit combining the features of units 20 and 30 would be required. More specifically, this would involve adding a CRC circuit (like unit 32) to unit 20. The incoming message would be entered into the complete message register, and its CRC checked by the CRC circuit. The incoming header would then be discarded, the new RIF field would then be determined, and finally the new CCF field would be determined by the unit 23.

The CRC circuit 42 can be identical to the CRC circuits 13 and 32 of units 10 and 30, apart from the fact that the CRC circuit 42 has to calculate its CRC from a quantity of different length to the quantities dealt with by the circuit 32. Further, the CRC fields which are used to check the message in unit 30 and the packet in unit 40 are identical.

The unit 40 may be the destination end unit for the data field; alternatively, the packet may be forwarded further through the network, eg with a new RIF being added by a unit corresponding to unit 20.

In summary, in the present system a packet is originated in a unit 10 as a data field DATA 11 plus a CRC (cyclic redundancy check) check field CRC 12 by a CRC circuit 13. This packet has a header HDR (with a routing information field RIF) added to it in a unit 20, converting it into a message for transmission through a message network. A check correction field CCF is computed by unit 23 in unit 20, by looking up precomputed check subfields stored with the routing subfields (the routing information field being constructed by selecting from the stored subfields), such that the CRC field is a valid CRC check field for the complete message. At the destination, unit 30 can be the final user unit, checking the entire message and extracting the data field DATA therefrom; the DATA field does not need to be checked, as the CRC field acts as a check both for the data field DATA alone and the entire message. (Alternatively, the message can be checked by a final switching unit 30 using a standard CRC check circuit 32 (and similarly at intermediate units 30', 30") and the original packet can be checked by another standard CRC check circuit 42 in the final user units 40.).

What is claimed is:

1. A method of formatting a data message to transmit data in a network, the method comprising:

providing a data field, to contain the data, within the data message;

calculating a data check value for the data;

providing a data check value field, to contain the calculated data check value, within the data message;

determining routing data for the data message;

providing a routing data field, to contain the routing data, within the data message;

calculating a check correction value for the routing data; and providing a check correction value field, to contain the calculated check correction value, within the data message, wherein the check correction value is calculated so that the calculated data check value is valid for the entire data message.

2. The method as recited in claim 1, wherein the data check value is calculated by a cyclic redundancy check (CRC) algorithm applied to the data.

3. The method as recited in claim 1, wherein the data check value is calculated by a modified cyclic redundancy check (CRC) algorithm including a first CRC polynomial and a second polynomial, the second polynomial being a function of a length of the data message.

4. A data packet format comprising:

a data field to hold data;

a data check value field to hold a data checking value representative of an algorithm applied to the data;

a routing data field to hold routing data; and a check correction field to hold a check correction value determined as a function of the routing data, wherein the check correction field is determined to be a value such that the data checking value is valid for the entire data packet.

5. The data packet format as recited in claim 4, wherein:

the routing data field and the check correction field are located in a header field.

* * * * *